Aug. 5, 1930.　　　　C. S. WORLEY　　　　1,772,197
INCLOSURE FOR RUMBLE SEATS OF AUTOMOBILES
Filed June 20, 1928　　2 Sheets-Sheet 1
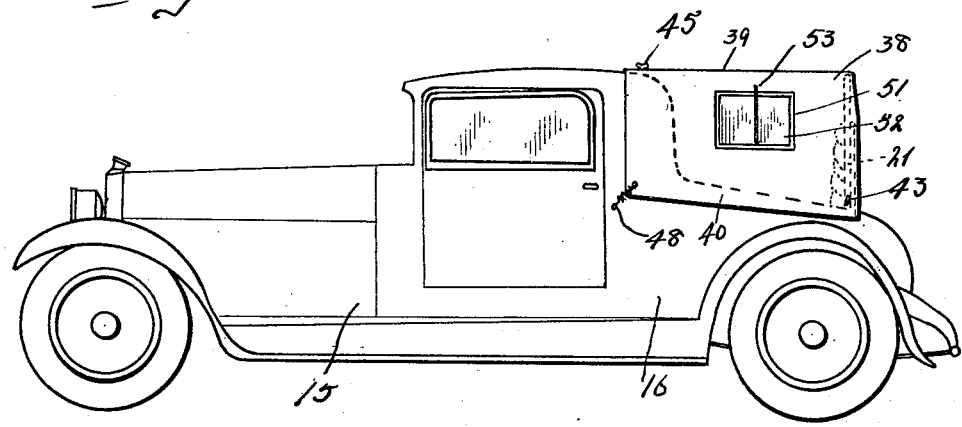
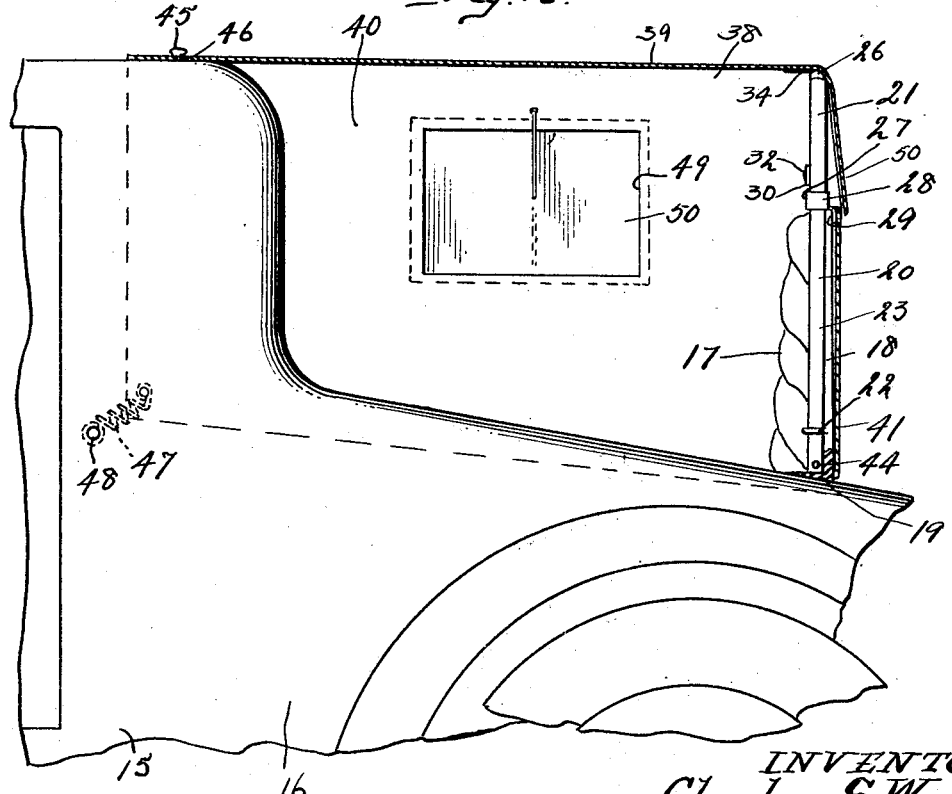
INVENTOR
Charles S. Worley
By W. W. Williamson
Atty.

Aug. 5, 1930.  C. S. WORLEY  1,772,197
INCLOSURE FOR RUMBLE SEATS OF AUTOMOBILES
Filed June 20, 1928   2 Sheets-Sheet 2
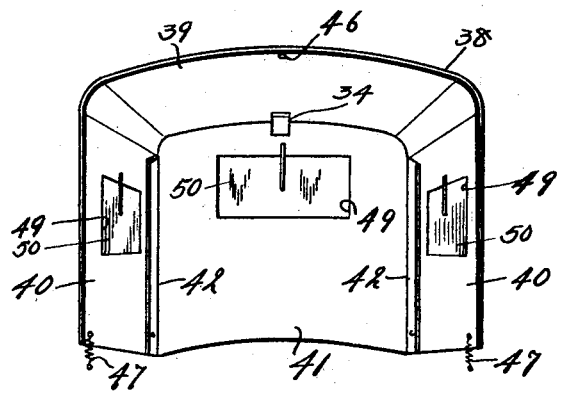
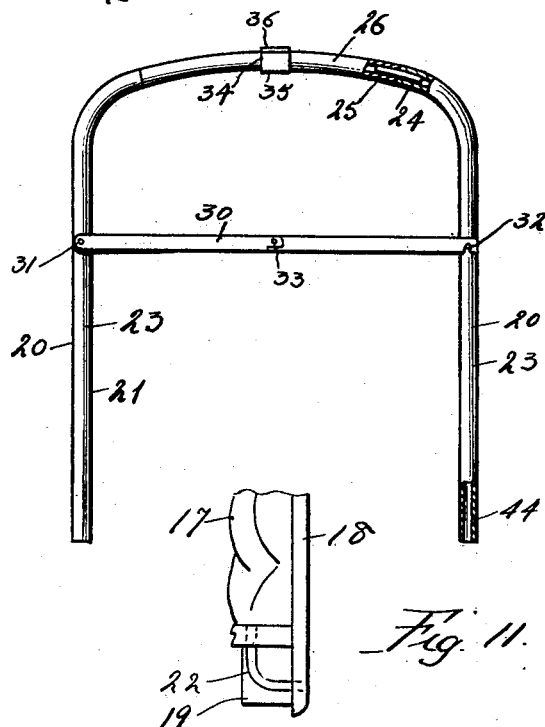
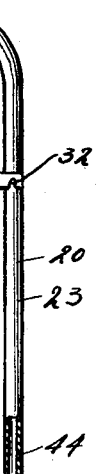
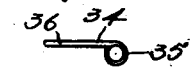
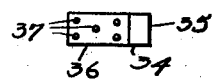
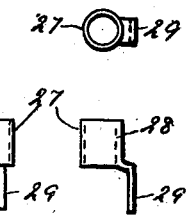
INVENTOR
Charles S. Worley
By W. W. Williamson
Atty.

Patented Aug. 5, 1930

1,772,197

UNITED STATES PATENT OFFICE

CHARLES S. WORLEY, OF PHILADELPHIA, PENNSYLVANIA

INCLOSURE FOR RUMBLE SEATS OF AUTOMOBILES

Application filed June 20, 1928. Serial No. 286,844.

My invention relates to new and useful improvements in an inclosure for rumble seats of automobiles and has for its primary object to provide an exceedingly simple and effective device of this character which may be readily and quickly placed upon the automobile or removed therefrom and used for inclosing that portion of the automobile occupied by the rumble seat in order that the occupants may be protected from the sun, wind or rain.

Another object of my invention is to provide a collapsible frame to support the inclosure thus permitting the cover to be made of pliable material, such as canvas or the like, and which may be painted or otherwise colored to resemble the color of the automobile body.

A further object of my invention is to provide unique means for supporting the frame in a rigid condition upon the back of the rumble seat.

A still further object of the invention is to provide several means for fastening the different parts of the cover whereby it will be securely held against the sides of the car body even while the car is traveling at a high rate of speed.

Another object of the invention is to provide windows in the cover in order to permit the occupants of the rumble seat to view the scenery even during inclement weather.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawings forming a part of this application, in which:

Fig. 1, is a side elevation of an automobile of the rumble seat type showing my inclosure installed.

Fig. 2, is an enlarged fragmentary side elevation of the automobile with the cover of the inclosure in section in order to illustrate the manner of mounting the frame.

Fig. 3, is an end view of the inclosure per se looking into it from the front end.

Fig. 4, is an elevation of the supporting frame with portions shown in section to illustrate details of construction.

Fig. 5, is an elevation of one of the side members of the frame at right angles to Fig. 4.

Fig. 6, is an enlarged edge view of the clip for securing the cover to the cross bow of the frame.

Fig. 7, is a face view thereof.

Fig. 8, is an end view of one of the clamps used on the frame side members.

Fig. 9, is an elevation thereof.

Fig. 10, is also an elevation of the clamp at right angles to the showing of Fig. 9.

Fig. 11, is an enlarged fragmentary plan or upper edge view of the rumble seat showing one of the sockets to receive the lower end of one of the frame side members.

In carrying out my invention as herein embodied, 15 represents an automobile of the rumble seat type including the usual body 16 in the rear portion of which is located the rumble seat 17 for movement into a vertical position when in use as shown in Figs. 1 and 2 or for placement in a substantially horizontal position as is obvious to persons skilled in this art and when in such position the back 18 of the rumble seat acts as a closure for the rear part of the automobile. This back of the rumble seat being of metal the same as the automobile body may have a portion at each side turned in or extra pieces connected therewith to provide rests or stops 19 which will be engaged by the lower ends of the side members 20 of the frame 21 when the latter is placed in position and after the side members have been passed through the sockets or guides 22 secured to the edges and back of the rumble seat as shown in Fig. 11.

The side pieces or members of the frame are preferably formed of tubular material and each consists of an upright or body 23 and an arm 24 at substantially right angles thereto, said arm receiving a reduced portion 25 of the cross bow 26 which has a reduced portion at each end. The reduced portion may be in the form of a dowel fixed in the bore of the bow at each end but it will be obvious that the reduced portion might be a part of each side member.

To further assist in holding the frame on the rumble seat when the latter is in a raised or open position as shown in Fig. 2, each side member may be provided with a clamp 27 including a sleeve 28 to slidably mount it upon a side member and a jaw 29 protruding from the sleeve and adapted to engage the back of the rumble seat.

To more thoroughly brace the frame, I provide a cross bar 30 pivoted as at 31 to one of the side members and the other end adapted to engage with a pin 32 on the other side member and in order to provide for folding the cross bar, it may be hinged at a point or points intermediate its ends as indicated at 33.

The cross bow 26 of the frame has a clip 34 mounted thereon by means of the collar 35 while the tongue 36 is provided with a number of perforations 37 by which the clip may be secured to the top portion at the rear end of the cover or inclosure 38.

The cover 38 is constructed from canvas or other suitable similar material having a certain amount of pliability in order that it may be rolled or folded when not in use and consists of a top 39, depending side walls 40 and a depending rear wall 41 having side flaps 42 overlapping the side walls 40. The back 41 is free along its side edges from the side walls 40 so that said back or either one of the side walls may be raised or folded independently of the others.

The rear ends of the side walls and the side edges of the rear wall, through the medium of its flaps, are secured to the frame side members by means of a suitable fastening device 43 in the form of a screw button which passes through the side walls and said flaps and have threaded connection with threaded holes 44, one in each side member.

The forward end of the cover may have its top fastened to the top of the automobile body by the usual turn button 45 or other equivalent fastening mounted on the top of the automobile body for registration with a hole 46 in the cover top, and the forward portions of the side walls may be similarly secured or fastened to the sides of the automobile body although I prefer to hold said sides under spring tension and therefore have shown springs 47 connected to the forward lower corners of said side walls which may be detachably fastened to the buttons 48 at the side of the automobile body. Under some conditions these buttons may be bolt heads of the stretcher arms which are used for ornamentation to simulate old time collapsible Victoria tops.

If found desirable, the back wall and both side walls may be provided with window openings 49 across which can be disposed a sheet of transparent material 50, such as glass or celluloid and with said openings may be associated closures 51 of opaque material or said closures may have apertures with sheets 52 of transparent material disposed across them.

The closures are preferably secured along their upper edges to the parts of the cover so that said closures may be opened by lifting their lower edges and they may be so located from the inside of the inclosure by fastening draw cords 53 on the outside adjacent the lower edges and then passing said core through apertures in the walls of the cover above the points of attachment of said closure to the cover so that the free ends of the cords may be pulled upon from the inside of the inclosure by the occupants to open the closures.

When the inclosure is not in use, it may be folded up and the frame dismantled and all parts placed within a small compact space within the tonneau.

When the inclosure is to be used, the frame may be readily mounted in place, it being understood that the cross bow 26 with the cover connected thereto by means of the clip 34 is mounted on the side members after the latter have been properly positioned but prior to the fastening of the cross bar or brace 30. With the cross bow in place, the covers are then pulled taut and fastened to the automobile body at the top and sides.

When the inclosure is to be used only as a sun shade, any one or both of the side walls or the back may be folded over the top of the cover and there secured by any suitable fastening means.

Of course I do not wish to be limited to the exact details of construction as herein shown, as these may be varied within the limits of the appended claim without departing from the spirit of my invention.

Having thus fully described my invention, what I claim as new and useful is:—

An inclosure for rumble seats of automobiles including a frame consisting of uprights, a bow having its ends detachably connected with the upper ends of the uprights, a collapsible cross bar having one end pivoted to one of the uprights and adapted to be connected to the other of said uprights, sockets carried by the vehicle body for the reception of the lower ends of the uprights, means slidably mounted on said uprights for engagement with the upper edge of the rumble seat back whereby said frame may be used in connection with seats having backs of different heights without changing the heights of the inclosure relative to the seat and a cover attached to the bow and adapted to be detachably connected with the automobile body.

In testimony whereof, I have hereunto affixed my signature.

CHARLES S. WORLEY.